United States Patent
Agombar et al.

(10) Patent No.: US 8,788,770 B2
(45) Date of Patent: *Jul. 22, 2014

(54) MULTIPLE CASCADED BACKUP PROCESS

(75) Inventors: John P. Agombar, Hampshire (GB);
Christopher B. Beeken, Hampshire (GB); William J. Scales, Hampshire (GB); John P. Wilkinson, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 102 days.

This patent is subject to a terminal disclaimer.

(21) Appl. No.: 13/069,293

(22) Filed: Mar. 22, 2011

(65) Prior Publication Data

US 2011/0296127 A1 Dec. 1, 2011

(30) Foreign Application Priority Data

May 25, 2010 (EP) .................................. 10163742

(51) Int. Cl.
*G06F 12/16* (2006.01)
*G06F 3/06* (2006.01)
*G06F 11/14* (2006.01)

(52) U.S. Cl.
CPC ............ *G06F 3/065* (2013.01); *G06F 11/1448* (2013.01)
USPC .................................. 711/162; 711/E12.103

(58) Field of Classification Search
CPC .. G06F 3/065; G06F 2201/84; G06F 11/1448
USPC ........................................................ 711/162
See application file for complete search history.

(56) References Cited

U.S. PATENT DOCUMENTS

| 7,007,143 B2 | 2/2006 | Cochran |
| 7,188,272 B2 | 3/2007 | Bartfai et al. |

(Continued)

FOREIGN PATENT DOCUMENTS

| CN | 1702627 | 11/2005 |
| CN | 1794199 | 6/2006 |

(Continued)

OTHER PUBLICATIONS

Data ONTAP 7.3 Manual Page Reference, 1994-2009, NetApp Inc., vol. 1, 271.*

(Continued)

*Primary Examiner* — April Y Blair
*Assistant Examiner* — Kenneth Tsang
(74) *Attorney, Agent, or Firm* — David W. Victor; Konrad Raynes Davda & Victor LLP

(57) ABSTRACT

Provided are a method, system, and a computer program product handling a backup process. An instruction is received initiating a new backup from a source volume to a target volume using one of a plurality of backup processes. A determination is made as to whether there is a cascade of volumes using the backup process including the source volume of the new backup. The cascade includes a cascade source volume and at least one cascade target volume, and a write to a storage location in one of the cascade volumes causes a copying of the storage location to be written in the cascade source volume to each of the cascade target volumes in the cascade according to a cascade order in which the at least one cascade target volume and the cascade source volume are linked in the cascade. The cascade, using the backup process of the new backup already including the source volume of the new backup, is modified to include the target volume of the new backup in response to determining that there is the existing cascade. A new cascade using the backup process of the new backup including the source volume and the target volume of the new backup is created in response to determining that there is not the existing cascade.

20 Claims, 6 Drawing Sheets

(56) References Cited

U.S. PATENT DOCUMENTS

| | | | |
|---|---|---|---|
| 7,191,304 B1* | 3/2007 | Cameron et al. | 711/202 |
| 7,360,048 B2 | 4/2008 | Agombar et al. | |
| 7,386,695 B2 | 6/2008 | Fuente | |
| 7,461,100 B2 | 12/2008 | Spear et al. | |
| 7,509,523 B2 | 3/2009 | Agombar et al. | |
| 7,676,641 B2 | 3/2010 | Agombar et al. | |
| 7,752,457 B2 | 7/2010 | Yagawa | |
| 7,793,144 B2 | 9/2010 | Agombar et al. | |
| 7,856,425 B2 | 12/2010 | Spear et al. | |
| 8,005,800 B2 | 8/2011 | Spear et al. | |
| 8,051,259 B2 | 11/2011 | Agombar et al. | |
| 8,230,185 B2 | 7/2012 | Agombar et al. | |
| 8,285,679 B2 | 10/2012 | Agombar et al. | |
| 2004/0030727 A1* | 2/2004 | Armangau et al. | 707/200 |
| 2005/0021565 A1 | 1/2005 | Kapoor et al. | |
| 2005/0278391 A1 | 12/2005 | Spear et al. | |
| 2006/0112244 A1 | 5/2006 | Buah et al. | |
| 2006/0139697 A1 | 6/2006 | Fuente | |
| 2006/0143413 A1 | 6/2006 | Agombar et al. | |
| 2006/0179061 A1 | 8/2006 | D'Souza | |
| 2006/0230243 A1* | 10/2006 | Cochran et al. | 711/162 |
| 2006/0242211 A1* | 10/2006 | Becker et al. | 707/204 |
| 2007/0016740 A1 | 1/2007 | Somavarapu | |
| 2007/0061531 A1 | 3/2007 | Bartfai et al. | |
| 2007/0294493 A1 | 12/2007 | Buah et al. | |
| 2008/0114951 A1 | 5/2008 | Lee | |
| 2008/0183973 A1* | 7/2008 | Aguilera et al. | 711/147 |
| 2008/0189482 A1* | 8/2008 | Fuente | 711/112 |
| 2008/0215837 A1 | 9/2008 | Agombar et al. | |
| 2008/0256311 A1 | 10/2008 | Lee | |
| 2009/0307450 A1* | 12/2009 | Lee | 711/162 |
| 2010/0023561 A1 | 1/2010 | Zlotnick | |
| 2010/0077160 A1 | 3/2010 | Liu et al. | |
| 2010/0088468 A1 | 4/2010 | Agombar et al. | |
| 2012/0246427 A1 | 9/2012 | Agombar et al. | |

FOREIGN PATENT DOCUMENTS

| | | |
|---|---|---|
| CN | 1828513 | 9/2006 |
| EP | 1 645 960 | 2/2007 |
| WO | 2010 049314 | 5/2010 |
| WO | 2011036015 | 3/2011 |
| WO | 2011036020 | 3/2011 |

OTHER PUBLICATIONS

U.S. Appl. No. 13/039,245, filed Mar. 2, 2011, by inventors J.P. Agombar, et al.

U.S. Appl. No. 13/039,108, filed Mar. 2, 2011, by inventors J.P. Agombar, et al.

U.S. Appl. No. 13/482,656, filed May 29, 2012, entitled "Multiple Cascaded Backup Process", by inventors J.P. Agombar, C.B. Beeken, W.J. Scales and J.P. Wilkinson (18.397C1).

Preliminary Amendment filed May 29, 2012, pp. 1-6, for U.S. Appl. No. 13/482,656, filed May 29, 2012, entitled "Multiple Cascaded Backup Process", by inventors J.P. Agombar, C.B. Beeken, W.J. Scales and J.P. Wilkinson (18.397C1).

PCT International Search Report dated Sep. 14, 2011 for Application No. PCT/EP2011/057950 filed May 17, 2011.

U.S. Appl. No. 13/244,094, filed Sep. 23, 2011, by inventors C.B. Beeken, et al.

U.S. Appl. No. 13/251,867, filed Oct. 3, 2011, by inventors C.B. Beeken, et al.

R. Hou, et a., "Data Replication and Recovery with Dell/EMC SnapView 2.0 and MirrorView", Dell Enterprise Systems, Feb. 2003, pp. 1-23.

W. Xiao, et al., "Case for Continuous Data Protection at Block Level in Disk Array Storages", IEEE Transactions on Parallel and Distributed Systems, vol. 20, No. 6, Jun. 2009, pp. 1-14.

English abstract of Chinese patent No. CN1794199, published Jun. 28, 2006 by S. Agombar et al.

U.S. Appl. No. 13/125,276, filed Apr. 30, 2011, by inventors J.P. Agombar, et al.

"Information Materials for IDS" dated Oct. 5, 2011 from Japanese Office Action dated Sep. 20, 2011 for Application No. 2011-533674 filed Oct. 20, 2009, pp. 1-2.

Office Action dated Mar. 28, 2013, pp. 1-30, for U.S. Appl. No. 13/482,656, filed May 29, 2012, by inventors J.P. Agombar, et al.

Chinese Office Action dated Nov. 29, 2012 for Serial No. 200980140528.6.

"Information Materials for IDS" dated Dec. 6, 2012 for Chinese Office Action dated Nov. 29, 2012.

English translation of CN1702627 Nov. 30, 2005.

English Translation of CN1828513 Sep. 6, 2006.

Response dated Jun. 28, 2013, pp. 10, to Office Action dated Mar. 28, 2013, pp. 1-30, for U.S. Appl. No. 13/482,656, filed May 29, 2012, by inventors J.P. Agombar, et al.

Response dated Jan. 24, 2014, pp. 12, to Final Office Action dated Sep. 24, 2013, pp. 41, for U.S. Appl. No. 13/482,656, filed May 29, 2012.

Final Office Action dated Sep. 24, 2013, pp. 41, for U.S. Appl. No. 13/482,656, filed May 29, 2012.

Notice of Allowance dated Mar. 18, 2014, pp. 15, for U.S. Appl. No. 13/482,656, filed May 29, 2012.

* cited by examiner

MULTIPLE CASCADED BACKUP PROCESS

CROSS-REFERENCE TO RELATED FOREIGN APPLICATION

This application is a non-provisional application that claims priority benefits under Title 35, Unites States Code, Section 119(a)-(d) from European Patent Application entitled "MULTIPLE CASCADED BACKUP PROCESS" by John P. AGOMBAR, Christopher B. BEEKEN, William J. SCALES, and John P. WILKINSON, having European Patent Application Serial No. EP10163742, filed on May 25, 2010, which application is incorporated herein by reference in its entirety.

BACKGROUND

1. Technical Field

This invention relates to a method of, and system for, handling a backup process.

2. Related Art

The storage of data in large organisations is of fundamental importance, both for reliability of the data and for the ability to recover data in the event of any hardware failure. Storage area network (SAN) is an architecture that is used when very large amounts of data are needed to be stored in a reliable and secure manner. This technology allows networks to be created that support the attachment of remote computer storage devices such as disk arrays to servers in such a way that, to the operating system, the devices appear as locally attached. It is common in these networks to include a large amount of redundancy, both in the data storage and in the hardware connections between the individual components.

Various methods exist for creating data redundancy. For example, a backup process such as a FlashCopy® function enables an administrator to make point-in-time, full volume copies of data, with the copies immediately available for read or write access. (FlashCopy is a registered trademark of International Business Machines Corporation in the United States and other countries) The FlashCopy can be used with standard backup tools that are available in the environment to create backup copies on tape. A FlashCopy function creates a copy of a source storage volume on a target storage volume. This copy, as mentioned above, is called a point-in-time copy. When a FlashCopy operation is initiated, a relationship is created between a source volume and target volume. This relationship is a "mapping" of the source volume and the target volume. This mapping allows a point-in-time copy of that source volume to be copied to the associated target volume. The relationship exists between this volume pair from the time that the FlashCopy operation is initiated until the storage unit copies all data from the source volume to the target volume, or until the relationship is deleted.

When the data is physically copied, a background process copies tracks (or "grains") of data from the source volume to the target volume. The amount of time that the process takes to complete the background copy depends on various criteria, such as the amount of data being copied, the number of background copy processes that are running and any other activities that are presently occurring. The FlashCopy function works in that the data which is being copied does not actually need to be copied instantaneously, it only needs to be copied just prior to an update causing on overwrite of any old data on the source volume. So, as data changes on the source volume, the original data is copied to the target volume before being overwritten on the source volume.

Therefore, a FlashCopy is an example of a feature supported on various storage devices that allows a user or an automated process to make nearly instantaneous copies of entire logical volumes of data. A copy of a source disk is made on a target disk. The copies are immediately available for both read and write access. A common feature of FlashCopy like implementations is the ability to reverse the copy. That is, to populate the source disk of a FlashCopy map with the contents of the target disk. It is also possible to use backup processes such as FlashCopy in cascaded implementations, in which a target disk later becomes the source disk for a further FlashCopy or vice versa.

A cascaded configuration of storage volumes is described in detail in U.S. Pat. No. 7,386,695. It is also possible to create multiple cascades of storage volumes which are interlocking at a logical level. A first cascade may comprise storage volumes A, B, C and D which are arranged in a cascade as follows: A⇆B⇆C⇆D, while at a later time new backups of A may be started to volumes E and F that ultimately leads to the creation of a second cascade A⇆E⇆F. Many different combinations of FlashCopy functions and reversed functions are possible, potentially creating complicated multiple cascading storage volumes.

There are two types of point-in-time (PIT) backup processes commonly used in data storage systems, called a clone and a snapshot. A clone is a PIT copy where the target disk will hold a complete copy of the data that was on the source disk when the PIT copy was started. When the copying of data from source to target completes, the target disk is independent of the source. A snapshot is a PIT copy where the target only holds the changed data necessary to present the PIT copy of the source. Data is only copied to the target disk if it is changed on the source. The target disk is generally always dependent on some of the data on the source disk in order to present the PIT copy.

Multiple target cascaded copying is a technique implemented in the IBM SAN Volume Controller FlashCopy. A cascade is used to implement multiple PIT copies of a single data source. For example, with a data source S and PIT copies of S taken at times t1, t2 and t3, then at time t1 there is taken a PIT copy using data target T1 resulting in a cascade: S→T1. Then at time t2 there is taken a second PIT copy using data target T2 and resulting in the cascade: S→T2→T1. This arrangement works because if data has been changed on T1 or S between times t1 and t2 the data will be on T1 and if the data has not been changed then both T1 and T2 want to read the same data. Similarly at t3 there is produced the cascade: S→T3→T2→T1.

This technique has many benefits. However, it also introduces dependencies between the data targets that would not exist in a traditional multiple target implementation. A side effect of this target dependency is the requirement to clean a target when a PIT copy is stopped or completes. For example, if PIT copy S→T2 is stopped, any data on T2 that is required by T1 must be copied from T2 to T1 before the target T2 can be removed from the cascade. In many situations this is not a problem, because the user may wish T1 to hold a complete copy of S at time t1, meaning that the backup process S→T1 is a clone. However, if the intention of S→T1 is just to produce a snapshot of S at time t1, this extra copying from T2 to T1 may cause the user problems. Further, if the data target T1 was thinly provisioned (also known as space efficient), the problems caused by the above behaviour may cause the unnecessary allocation of storage to T1. This would seriously reduce the user's ability to maintain snapshots and clones and to manage their backups.

There are a number of existing techniques that attempt to reduce the amount of data that is copied from T2 to T1, with varying degrees of success. There is no solution that can produce the minimal number of copies from T2 to T1, without dramatically increasing the amount of metadata used to track the contents of the various data targets.

It is therefore an object of the invention to improve upon the known art.

SUMMARY

Provided are a method, system, and a computer program product handling a backup process. An instruction is received initiating a new backup from a source volume to a target volume using one of a plurality of backup processes. A determination is made as to whether there is a cascade of volumes using the backup process including the source volume of the new backup. The cascade includes a cascade source volume and at least one cascade target volume, and a write to a storage location in one of the cascade volumes causes a copying of the storage location to be written in the cascade source volume to each of the cascade target volumes in the cascade according to a cascade order in which the at least one cascade target volume and the cascade source volume are linked in the cascade. The cascade, using the backup process of the new backup already including the source volume of the new backup, is modified to include the target volume of the new backup in response to determining that there is the existing cascade. A new cascade using the backup process of the new backup including the source volume and the target volume of the new backup is created in response to determining that there is not the existing cascade.

BRIEF DESCRIPTION OF THE DRAWINGS

Embodiments of the present invention will now be described, by way of example only, with reference to the accompanying drawings, in which.

DETAILED DESCRIPTION

Figure 1:
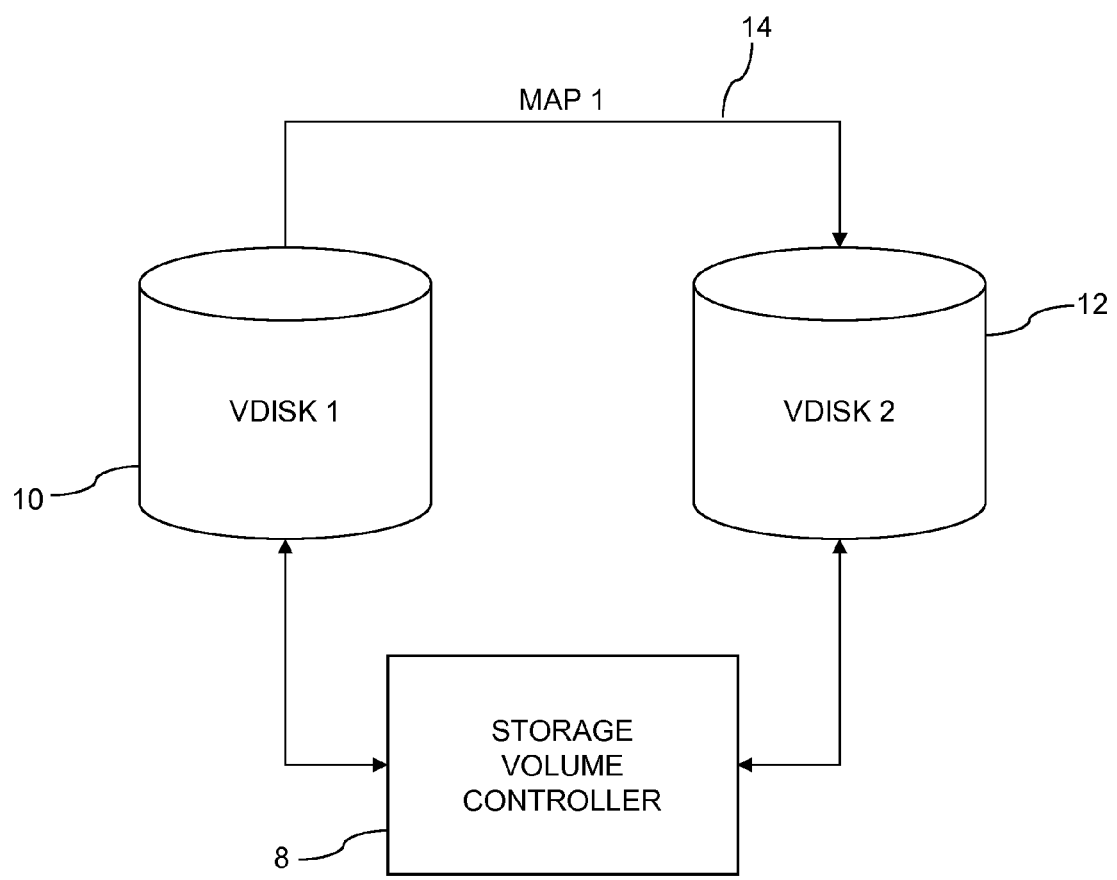
FIG. 1 is a schematic diagram of a pair of storage volumes.

In one embodiment, there is provided a method of handling a backup process comprising receiving an instruction initiating a backup process from a source storage volume to a target storage volume, identifying the type of backup process as either a full backup process intended to make a complete copy of the source storage volume on the target storage volume or a fractional backup process intended to make a copy of data changed on the source storage volume on the target storage volume, and if a cascade exists for the identified backup process type, adding the target storage volume to the existing cascade for the identified backup process type, or if a cascade does not exist for the identified backup process type, starting a new cascade of the target storage volume from the source storage volume.

In another embodiment, there is provided a system for handling a backup process comprising a plurality of storage volumes and a storage volume controller connected to the storage volumes, the storage controller arranged to receive an instruction initiating a backup process from a source storage volume to a target storage volume, identify the type of backup process as either a full backup process intended to make a complete copy of the source storage volume on the target storage volume or a fractional backup process intended to make a copy of data changed on the source storage volume on the target storage volume, and if a cascade exists for the identified backup process type, add the target storage volume to the existing cascade for the identified backup process type, or if a cascade does not exist for the identified backup process type, start a new cascade of the target storage volume from the source storage volume.

In a further embodiment, there is provided a computer program product on a computer readable medium for handling a backup process, the product comprising instructions for receiving an instruction initiating a backup process from a source storage volume to a target storage volume, identifying the type of backup process as either a full backup process intended to make a complete copy of the source storage volume on the target storage volume or a fractional backup process intended to make a copy of data changed on the source storage volume on the target storage volume, and if a cascade exists for the identified backup process type, adding the target storage volume to the existing cascade for the identified backup process type, or if a cascade does not exist for the identified backup process type, starting a new cascade of the target storage volume from the source storage volume.

With the described embodiments, it is possible to overcome the issues in the prior art implementations of cascading backup processes by ensuring that a snapshot is does not depend on a clone. The described embodiments allow multiple cascades for a single data source. The advantage of this approach is that snapshots are in a separate dependency chain (or cascade) from clones, and therefore a clone will not copy data onto a snapshot. This means that a snapshot does not hold data that it does not need. No extra metadata is required for the tracking of data on the various data targets. Separate cascades are maintained from a source volume such that a backup process that is a clone is not in a cascade with a backup process that is a snapshot, and vice versa.

In certain embodiments, the type of backup process is identified as a restore process intended to restore a complete copy of the source storage volume on the target storage volume and a new cascade of the target storage volume is started from the source storage volume. In certain embodiments, any backup processes that are intended to restore a storage volume, for example, as a response to data corruption of the storage volume, are handled in a separate cascade.

The described embodiments may further detect that a backup process identified as a snapshot is stopped and stopping all backup processes from the target storage volume of the detected backup process and further detect that a backup process identified as a clone is stopped and stopping all backup processes identified as snapshots from the target storage volume of the detected backup process. It is important that the stopping of backup processes is handled in a consistent manner. The approach detailed above is taken because a snapshot is always dependent on its source and if the source is destroyed the snapshot is of no use anymore.

FIG. 1 illustrates the concept of a backup process using a storage controller 8 and two storage disks 10 and 12. The disks 10 and 12 could form part of a larger array of disks, and may form part of an enterprise storage solution. The disks 10 and 12 could be part of a storage solution relating to a commercial website, for example. If at any time a backup needs to be made of the content of vdisk1, then a FlashCopy instruction can be sent from the storage volume controller 8 to that disk 10, which defines a source disk 10 (vdisk1) and also a target disk 12 (vdisk2), which is the target of the FlashCopy.

The FlashCopy instruction creates a point-in-time copy of the image of the specific vdisk which is the source disk 10.

In the embodiment of FIG. 1, the source disk 10 of a first FlashCopy instruction is vdisk1, and the target disk 12 is vdisk2. The FlashCopy instruction starts the FlashCopy process, which creates a map 14 from the source disk 10 to the target disk 12. This map is labelled MAP 1 in the Figure. The image of vdisk1 at this specific point in time is now available on vdisk2. This creates a backup of the data on vdisk1, and also allows tests and other administration tasks to be run on the data of vdisk1, without the attendant danger of losing any of the original data, as it is preserved on the original source disk.

When a FlashCopy is made, it creates a link between the two disks 10 and 12, as defined by the map 14. Data may now be copied across in the background, with the additional requirement that any access to vdisk2 (as the target disk 12) may immediately cause the relevant parts of the image of vdisk1 to be copied across, and also any access to vdisk1 which would result in a change to the image stored by that disk 10 will also cause the unaltered data to be immediately copied across to the target disk 12, prior to the change being made. In this way, the vdisk2, to an outside user, stores the point in time copy of vdisk1, although data may only be physically copied across under the circumstances described above.

Figure 2:
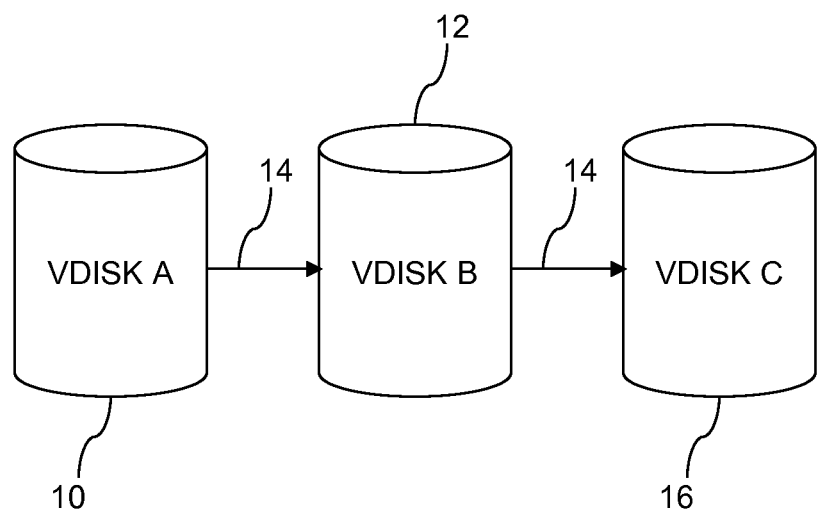
FIG. 2 is a schematic diagram of a FlashCopy cascade.

A storage volume that is the target volume of a backup process such as a FlashCopy function can also be the source volume of a further backup process, thus creating a cascade of storage volumes. In FIG. 2 there is shown an example of a FlashCopy cascade of three storage volumes 10, 12 and 16, which are linked by FlashCopy maps 14. Each map 14 defines a backup process from a source volume to a target volume. Disk B is providing a backup of disk A, and disk C is also providing a backup of disk A, through disk B. The FlashCopy functions 14 linking the different storage volumes may have been started at different times, which create different point-in-time copies of the images stored by the respective storage volumes, or could have been started simultaneously.

In the FlashCopy cascade of A→B→C, where A, B and C are the disks in the cascade, as shown in FIG. 2, and the arrows are the FlashCopy maps, then denoting (A, B) to be a Flash-Copy mapping from disk A to disk B, the cascade has maps (A, B) and (B, C). In this implementation of the cascade, any new data write to disk A will cause a write to disk B, as per the respective FlashCopy function, which is required to maintain the image on disk B. This writing to disk B will cause a further clean read of disk B followed by a write to disk C. In this way a single write to the first storage volume 10 in the cascade can result in a number of operations throughout the cascade.

When a cascade is created, the new maps and new storage volumes are inserted into the cascade, not added to the end of the cascade. In the cascade shown in FIG. 2, the first backup process started would be A→C. When the backup process A→B is then started, the new target storage volume B is effectively "inserted" between the existing source storage volume A and the existing target storage volume C. This "insertion" is purely a logical construction illustrating the fact that target disk C will receive data writes from disk B, rather than disk A. This is how a cascaded implementation differs from a conventional arrangement which would have two independent maps from disk A.

Figure 3A:
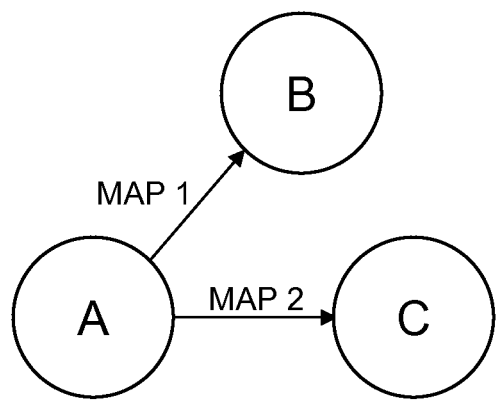
FIG. 3 is a schematic diagram of different arrangements of storage volumes.
Figure 3B:
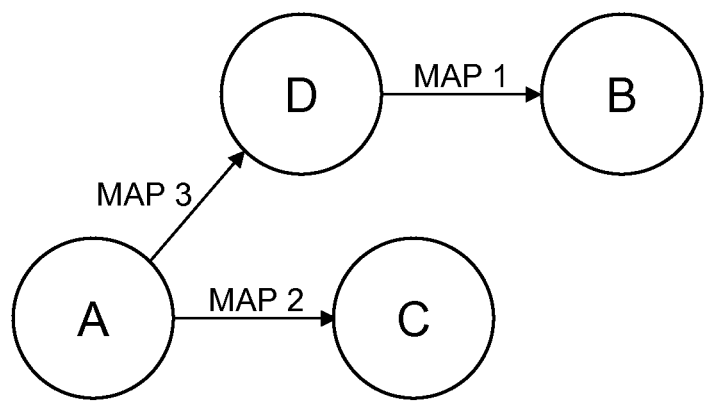

More complex arrangements will be created as more backup processes are started from different storage volumes. For example, FIG. 3*b* shows four disks A, B, C and D with three PIT maps between them from the source volume A. The storage volume controller 8 is operated so that the disks and maps are arranged so that clones and snapshots are separated into different dependency chains or cascades. For example, suppose Map 1 is started as a clone and then some time later Map 2 is started as a snapshot. Then the resulting graph structure used to maintain the target images would be as shown in FIG. 3*a*. This structure is a dependency graph.

In the graph shown in FIG. 3*a*, a data write to disk A may require copy on writes to B and/or C in order to maintain those images on the target disks of the respective backup processes. If the storage volume controller 8 now starts Map 3, as a clone, the resulting dependency graph is as shown in FIG. 3*b*. In a cascade, the new disk and map to that disk are always placed adjacent to the source disk A, so the new target disk D of map 3 is placed in cascade A→D→B, where the two maps 3 and 1 are both clones. In the separate cascade A→C the map 2 is a snapshot.

Subsequent backup processes as either snapshots or clones of A extend the length of the clone and/or snapshot chains without increasing the number of edges leaving A and so do not increase the number of IOs (Input/Outputs) required for any write to A. The graph of FIG. 3*b* can be extended to include further snapshots and clones. As a general rule, if a cascade exists for the specific backup process type (clone or snapshot), then the target storage volume is added to the existing cascade for the identified backup process type, or if a cascade does not exist for the identified backup process type, then a new cascade is started, which consists of the target storage volume and the source storage volume.

Figure 4:
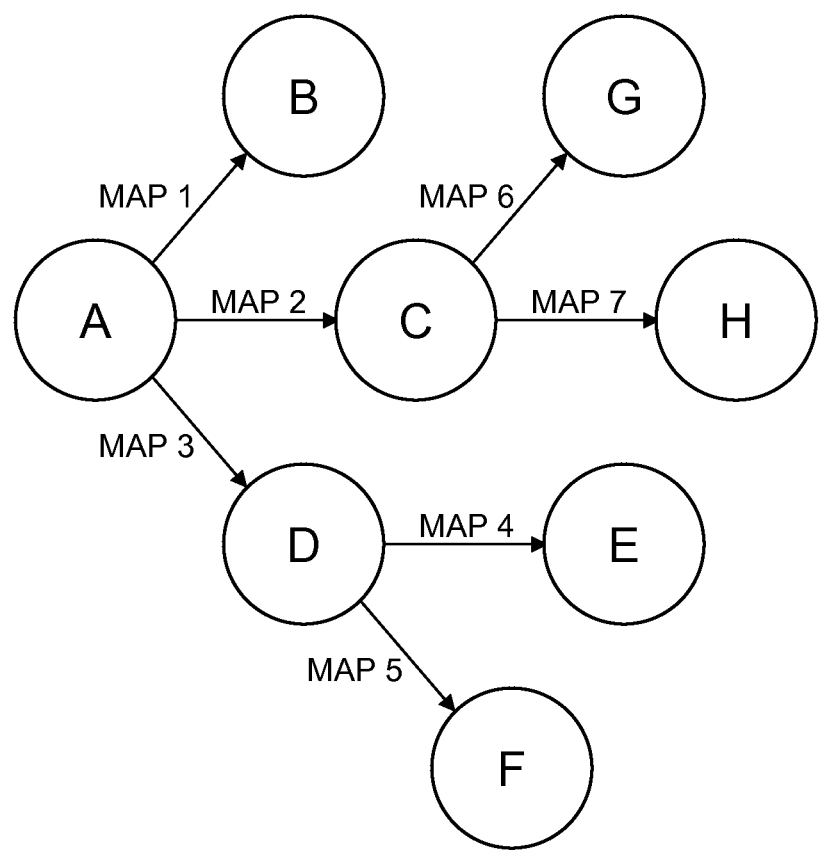
FIG. 4 is a schematic diagram of a logical arrangement of storage volumes.

FIG. 4 illustrates the logical arrangement of the storage volumes after further backups E, F, G and H have been taken. The backups E and F, defined by respective maps 4 and 5, are taking backups of disk D. The backups G and H, defined by respective maps 6 and 7, are taking backups of disk C. FIG. 4 is only showing the logical arrangement of the backup maps, not the actually configuration of the backup processes that will be set-up by the storage volume controller 8 to implement the arrangement shown in FIG. 4. As can be seen in FIG. 3*b*, the result of starting the map 3 from A to D is to create the cascade A→D→B.

Figure 5:
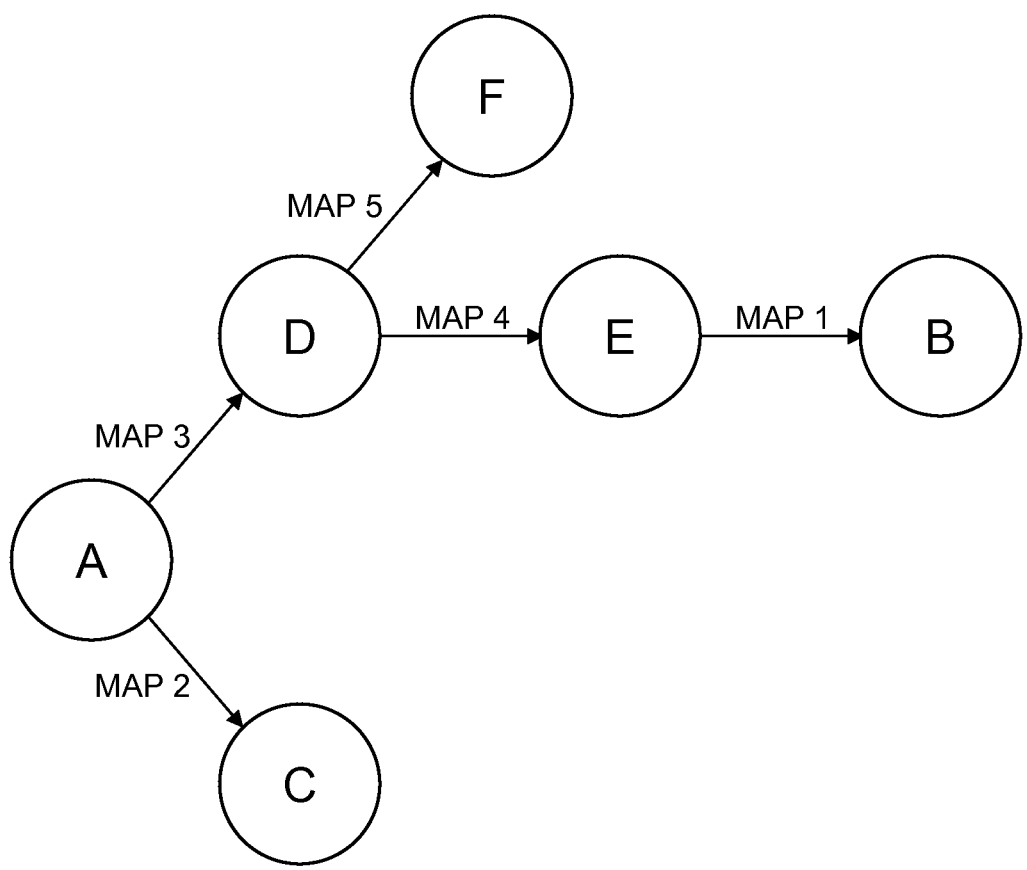
FIGS. 5 and 6 are further schematic diagrams of different arrangements of storage volumes.

Now suppose that map 4 is started as a clone and map 5 is started as a snapshot then the resulting arrangement of backups and storage volumes will be as shown in FIG. 5. This Figure is essentially the arrangement shown in FIG. 3*b* plus the two backups of disk D defined by maps 4 and 5 to volumes E and F respectively. Since map 4 is a clone this can be placed in the cascade from volume D to B, since the map 1 to disk B is also a clone. The last started map is always placed closest to the source disk, in this case creating the cascade D→E→B.

Disk D, which is the target of map 3 from disk A, is the source disk for the backup process defined by map 4 and hence disk E is place adjacent to disk D in the creation of the new cascade D→E→B. Map 5, however, is a snapshot and so must be the start of a new cascade with respect to its source storage volume (disk D). Hence the new map 5 defines a new cascade D→F. This is a cascade of snapshot backup processes from the disk D. In this way clones and snapshots taken from specific source disks never appear in the same cascade from that specific source disk.

If map 5 to disk F was a snapshot backup of disk A (rather than disk D) then it would have been placed between disks A and C to form the cascade A→F→C. The snapshot backup processes that have A as a source disk will always be placed in this cascade, just as clone back up processes with A as the source disk will be placed in the other cascade (between A and D). Any backup processes from other disks in the cascade will follow the same rules of either entering an existing cascade for the backup process type, or creating a new cascade if one does not already exist.

Figure 6:
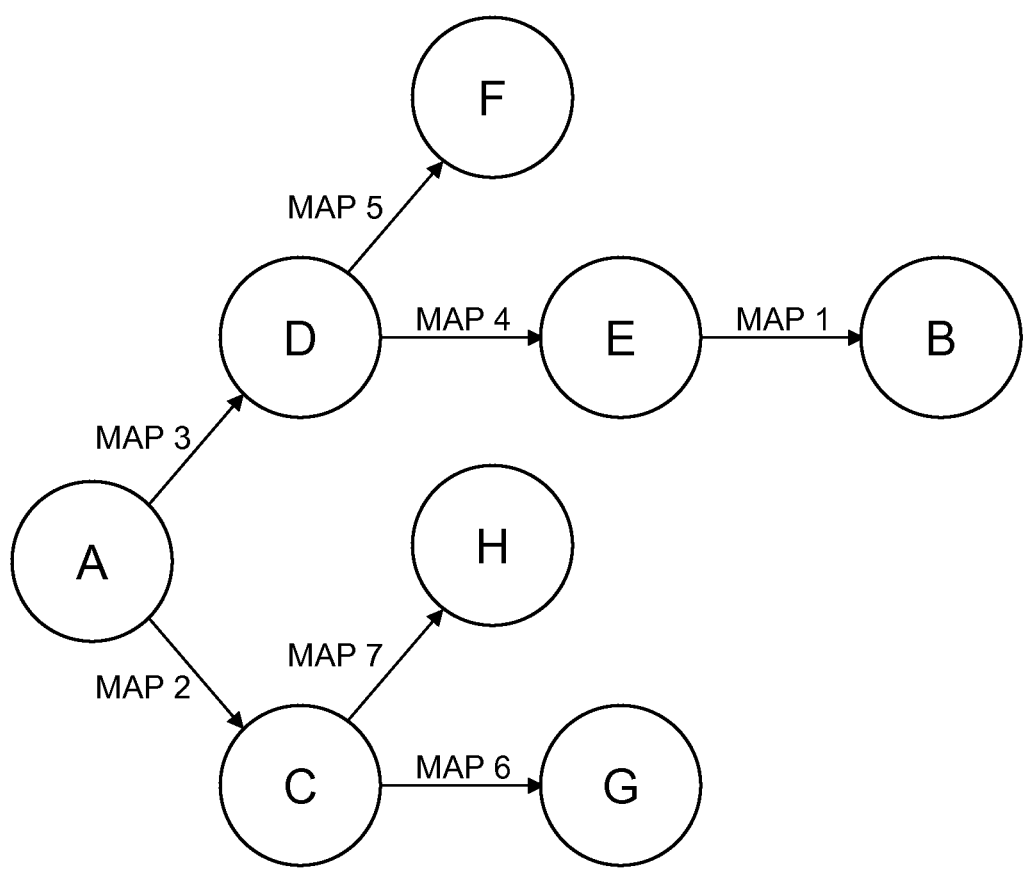

For example, if map 6 is started as a clone and if map 7 is started as a snapshot then the arrangement will be as shown in FIG. 6. Both these backup processes are from disk C and so two new cascades are formed from that storage volume. This example shows how the dependency graphs are constructed when maps are started as snapshots or clones. Any new backup processes from any disk in the cascades of FIG. 6 will be handled in the same manner. For each new backup process that is taken at any future from any disk, either a cascade already exists for the backup process type, or a new cascade is created.

As with multiple target PIT copies, writes to a disk in a dependency graph would result in a read, split writes and a client write. For example, a client (or host) write to B in the above dependency graph may result in a read of A, if the data required by B for the location being written to is on A, a write to F of the data read from A, if F is dependent on B, a write to E of the data read from A, if E is dependent on B (which can be performed in parallel to the second action, and finally the client write itself to B. This is the maximum number of IO operation required. So we see that the IO algorithm is a mixture of the traditional multiple target implementation with the multiple target cascaded implementation.

One advantage of this solution is that the clones and snapshots of a source volume are not mixed. For example, if map 4 is stopped in the dependency graph of FIG. 6, then the storage volume controller 8 will "clean" the data from E to D. This is not a problem because D is also a clone and does not mind if the data is copied onto it. The snapshot F is not affected.

Rules need to be considered concern the stopping of maps in a dependency graph whose target is the source of other snapshots and clones. There are many approaches that could be taken by anyone skilled in the art. In this implementation, the preferred embodiment is defined below. Rule 1—when a snapshot is stopped all snapshots and clones of the target disk are also stopped. Rule 2—when a clone is stopped all snapshots of the target disk are also stopped. This approach is taken because a snapshot is always dependent on its source and if the source is destroyed the snapshot is of no use anymore.

What is claimed is:

1. A computer program product on a non-transitory computer readable medium for handling a backup process, the product comprising instructions for:
   receiving an instruction initiating a new backup from a source volume to a target volume using a specified backup process type comprising one of a clone and snapshot, wherein the clone comprises a point-in-time copy, and wherein the target volume holds a complete copy of data on the source volume;
   determining, from a computer readable medium maintained by a storage volume controller, whether there is an existing cascade of volumes using the specified backup process type including the source volume of the new backup, wherein a cascade includes a cascade source volume from which data is written to at least one cascade target volume using a cascade backup process type comprising one of the snapshot and clone backup process types;
   modifying the determined existing cascade using the specified backup process type to include the target volume of the new backup in response to determining the existence of the cascade using the specified backup type; and
   creating a new cascade using the specified backup process type of the new backup including the source volume and the target volume of the new backup in response to determining that there is not the existing cascade using the specified backup process type, wherein a cascade extending from one source volume will only copy data to target volumes in the cascade using the cascade backup process type with which the target volume was created so that data from a clone backup process type is not copied to a target volume created using the snapshot backup process type and vice versa.

2. The computer program product of claim 1, wherein modifying the cascade to include the target volume of the new backup further comprises:
   including the target volume of the new backup between the cascade source volume and the cascade target volume linked to the cascade source volume in the cascade order in response to determining that the source volume of the new backup is the cascade source volume.

3. The computer program product of claim 1, wherein modifying the cascade to include the target volume of the new backup further comprises:
   including the target volume of the new backup between a first cascade target volume linked to the cascade source volume and a second cascade target volume linked to the first cascade target volume in response to determining that the source volume of the new backup is the first cascade target volume.

4. The computer program product of claim 1, wherein two cascades for the two backup process types have a common cascade source volume and at least one common cascade target volume linked to the cascade source volume.

5. The computer program product of claim 4, wherein a write to one cascade target volume in one of the two cascades causes data to be written from the common cascade source volume to the cascade target volumes in the two cascades.

6. The computer program product of claim 1, wherein creating the new cascade comprises:
   in response to determining that there is an existing cascade of a different backup process type than the new backup and that the existing cascade includes a cascade source volume and a cascade target volume that is the source volume of the new backup, forming the new cascade, using the specified backup process type, to include the cascade source volume and the cascade target volume of the existing cascade and to link the target volume of the new backup to the cascade target volume of the existing cascade.

7. The computer program product of claim 1, further comprising identifying the specified backup process type of the new backup as a restore process intended to restore a complete copy of the source volume on the target volume and starting a new cascade of the target volume from the source volume.

8. The computer program product of claim 1, wherein the backup process types further comprise a fractional backup process and a full backup process, further comprising:
   detecting that a backup process type of a source volume to a target volume identified as the fractional backup process type is stopped; and
   stopping all backup processes to target volumes that follow the target volume in the stopped backup process in at least one cascade of the fractional backup process type and the full backup process type.

9. A system for handling a backup process comprising:
a plurality of volumes; and
a storage volume controller connected to the volumes, wherein the storage controller performs operations, the operations comprising:
  receiving an instruction initiating a new backup from a source volume to a target volume using a specified backup process type comprising one of a clone and snapshot, wherein the clone comprises a point-in-time copy, and wherein the target volume holds a complete copy of data on the source volume;
  determining, from a computer readable medium maintained by a storage volume controller, whether there is an existing cascade of volumes using the specified backup process type including the source volume of the new backup, wherein a cascade includes a cascade source volume from which data is written to at least one cascade target volume using a cascade backup process type comprising one of the snapshot and clone backup process type;
  modifying the determined existing cascade using the specified backup process type to include the target volume of the new backup in response to determining the existence of the cascade using the specified backup type; and
  creating a new cascade using the specified backup process type of the new backup including the source volume and the target volume of the new backup in response to determining that there is not the existing cascade using the specified backup process type, wherein a cascade extending from one source volume will only copy data to target volumes in the cascade using the cascade backup process type with which the target volume was created so that data from a clone backup process type is not copied to a target volume created using the snapshot backup process type and vice versa.

10. The system of claim 9, wherein modifying the cascade to include the target volume of the new backup further comprises:
  including the target volume of the new backup between the cascade source volume and the cascade target volume linked to the cascade source volume in the cascade order in response to determining that the source volume of the new backup is the cascade source volume.

11. The system of claim 9, wherein modifying the cascade to include the target volume of the new backup further comprises:
  including the target volume of the new backup between a first cascade target volume linked to the cascade source volume and a second cascade target volume linked to the first cascade target volume in response to determining that the source volume of the new backup is the first cascade target volume.

12. The system of claim 9, wherein two cascades for the two backup process types have a common cascade source volume and at least one common cascade target volume linked to the cascade source volume.

13. The system of claim 12, wherein a write to one cascade target volume in one of the two cascades causes data to be written from the common cascade source volume to the cascade target volumes in the two cascades.

14. The system of claim 9, wherein creating the new cascade comprises:
  in response to determining that there is an existing cascade of a different backup process type than the new backup and that the existing cascade includes a cascade source volume and a cascade target volume that is the source volume of the new backup, forming the new cascade, using the specified backup process type of the new backup, to include the cascade source volume and the cascade target volume of the existing cascade and to link the target volume of the new backup to the cascade target volume of the existing cascade.

15. The system of claim 9, further comprising identifying the specified backup process type of the new backup as a restore process intended to restore a complete copy of the source volume on the target volume and starting a new cascade of the target volume from the source volume.

16. The system of claim 9, wherein the backup process types further comprise a fractional backup process and a full backup process, further comprising:
  detecting that a backup process of a source volume to a target volume identified as the fractional backup process type is stopped; and
  stopping all backup processes to target volumes that follow the target volume in the stopped backup process in at least one cascade of the fractional backup process type and the full backup process type.

17. The computer program product of claim 1, wherein the backup process types include a full backup process to make a complete copy of the source volume on the target volume and a fractional backup process to make a copy of data changed on the source volume on the target volume.

18. The computer program product of claim 1, wherein the backup process types comprise a fractional backup process and a full backup process, wherein the operations further comprise:
  detecting that the full backup process of a source volume to a target volume identified is stopped; and
  stopping all backup processes to target volumes that follow the target volume in the stopped backup process in at least one cascade of the fractional backup process type.

19. The system of claim 9, wherein the backup process types include a full backup process to make a complete copy of the source volume on the target volume and a fractional backup process to make a copy of data changed on the source volume on the target volume.

20. The system of claim 9, wherein the backup process types comprise a fractional backup process and a full backup process, wherein the operations further comprise:
  detecting that the full backup process of a source volume to a target volume identified is stopped; and
  stopping all backup processes to target volumes that follow the target volume in the stopped backup process in at least one cascade of the fractional backup process type.

* * * * *